UNITED STATES PATENT OFFICE.

HENRY DREYFUS, OF BASEL, SWITZERLAND.

MANUFACTURE OF ACETIC ALDEHYDE.

1,310,984.  Specification of Letters Patent.  Patented July 22, 1919.

No Drawing. Original application filed June 1, 1917, Serial No. 172,325. Divided and this application filed April 17, 1918. Serial No. 229,174.

*To all whom it may concern:*

Be it known that I, HENRY DREYFUS, of Basel, Switzerland, have invented certain new and useful Improvements Relating to the Manufacture of Acetic Aldehyde, of which the following is a specification.

This invention has reference to the manufacture of acetic aldehyde from acetylene by processes wherein acetylene is passed into an absorbing solution containing dilute sulfuric acid and oxid or other compounds of mercury, and in particular by the process described in my application for U. S. patent Serial No. 172,325, filed 1 June 1917, of which the present application is a division.

Such a manufacture of acetaldehyde presents particular importance in view of the employment of acetaldehyde for conversion into acetic acid.

Great difficulty has been presented by the problem of providing apparatus which would permit of carrying out such a manufacture of acetaldehyde on an industrial scale.

This difficulty is chiefly due to the employment of mercury or its salts or compounds in the absorbing solution, as these amalgamate with all metals except iron, so that these metals cannot be used. Iron itself cannot be used for the apparatus, as it is attacked by the acid of the absorbing solution, so that the mercury is precipitated even before the acetylene is introduced, and therefore before formation of the acetaldehyde. Glass is inapplicable for the apparatus on an industrial scale, and in view of the volatile nature of the acetaldehyde it is difficult to employ an earthenware apparatus, the more so as strong agitation is necessary and the apparatus is required to withstand pressure and heating. An ordinary earthenware apparatus is therefore unsuitable for the conditions, especially as there is risk of its breaking and as acetaldehyde and acetylene are very volatile and inflammable.

By the present invention I have found the means of solving this difficult problem of the apparatus to be employed, with metal thereby allowing of rendering the apparatus safe in working, and of obviating the danger that acetic aldehyde and acetylene can present in apparatus which cannot be relied upon without risk of a serious accident occurring at any moment.

The invention allows of establishing the manufacture of acetic aldehyde, and consequently also of acetic acid, on the largest scale.

According to my invention I employ for the absorption of the acetylene in the absorption solution containing dilute sulfuric acid and mercury compound, apparatus whereof parts exposed to the absorbing solution are lined or covered with lead, itself coated with an insoluble layer of a compound of lead which is resistant both to the action of the sulfuric acid and to amalgamation with mercury.

Based on the property possessed by lead of withstanding the action of sulfuric acid, in which acid lead does not dissolve, but rather forms a layer of lead sulfate, I have found that by treating or heating lead, for example in a lead-covered iron apparatus, with more or less diluted sulfuric acid, preferably in presence of an oxidizing agent such as nitric acid, there is formed on the lead a layer of sulfate of lead and (especially in presence of an oxidizing agent such as nitric acid) oxid of lead mixed with sulfate of lead, which remains sufficiently solidly on the lead, and which, even if the mercury comes in contact with it in the process of manufacturing the acetaldehyde, gives no amalgamation, but protects the lead against the amalgamation and does not dissolve in the absorbing liquid.

In carrying out my invention I employ for the parts of the absorption apparatus which come into the absorption solution, lead which has been subjected to the aforesaid treatment and thereby provided with said layer resistant to the dilute sulfuric acid and amalgamation. For example the inside of an iron absorption vessel is covered with lead the surface of which is treated in the manner referred to, so that the said resistant layer is obtained on the lead, and the stirrer and its shaft usually employed as mentioned in my said U. S. specification Serial No. 172,325 should be similarly coated.

In practice I treat the interior of the absorption apparatus lined with lead, or the parts of the apparatus liable to come into contact with the absorption solution, with a mixture of dilute sulfuric acid and nitric acid, and heat them in contact with said mixture until the resistant layer of lead sufate and lead oxid has formed thereon.

I may, however, coat the lead with a compound of lead, such as oxid of lead, which will form sulfate of lead in contact with the sulfuric acid of the absorbing solution itself.

What I claim as my invention, and desire to secure by Letters Patent, is:—

1. In a process for the manufacture of acetaldehyde by the passage of acetylene into an absorbing solution containing dilute sulfuric acid and a mercury compound, carrying out the absorption reaction in apparatus whereof parts exposed to the absorbing solution consist of lead coated with an insoluble layer of a compound of lead which is resistant to the action of dilute sulfuric acid and to amalgamation with mercury.

2. In a process for the manufacture of acetaldehyde by the passage of acetylene into an absorbing solution containing dilute sulfuric acid and a mercury compound, carrying out the absorption reaction in apparatus whereof parts exposed to the absorption solution consist of lead coated with an insoluble layer containing lead sulfate resistant to dilute sulfuric acid and amalgamation with mercury.

3. In a process for the manufacture of acetaldehyde by the passage of acetylene into an absorbing solution containing dilute sulfuric acid and a mercury compound, carrying out the absorption reaction in apparatus whereof parts exposed to the absorption solution consist of lead coated with an insoluble layer of oxid of lead and sulfate of lead.

In testimony whereof, I have hereunto subscribed my name.

HENRY DREYFUS.